(12) United States Patent
Pöyhönen et al.

(10) Patent No.: US 7,747,267 B2
(45) Date of Patent: Jun. 29, 2010

(54) APPARATUS, METHOD AND COMPUTER PROGRAM PRODUCT PROVIDING SYSTEM INFORMATION ADVERTISEMENT EXTENSION FOR DYNAMIC NETWORKS

(75) Inventors: Petteri Pöyhönen, Helsinki (FI); Ove Strandberg, Lappböle (FI)

(73) Assignee: Nokia Corporation, Espoo (FI)

( * ) Notice: Subject to any disclaimer, the term of this patent is extended or adjusted under 35 U.S.C. 154(b) by 706 days.

(21) Appl. No.: 11/652,816

(22) Filed: Jan. 12, 2007

(65) Prior Publication Data
US 2007/0180320 A1 Aug. 2, 2007

Related U.S. Application Data

(60) Provisional application No. 60/758,758, filed on Jan. 13, 2006.

(51) Int. Cl.
*H04B 7/00* (2006.01)
(52) U.S. Cl. ............... 455/517; 455/450; 455/509; 455/516; 455/525
(58) Field of Classification Search ......... 455/436–441, 455/444–445, 448–450, 500, 507, 524–525, 455/452.1, 453, 455, 464, 509–513, 516–517
See application file for complete search history.

(56) References Cited

U.S. PATENT DOCUMENTS

| | | | |
|---|---|---|---|
| 6,760,599 B1 | 7/2004 | Uhlik | ............... 455/525 |
| 7,418,004 B2 * | 8/2008 | Chou | ............... 370/449 |
| 7,492,721 B2 * | 2/2009 | Ishikawa | ............... 370/252 |
| 7,536,205 B2 * | 5/2009 | Van Rensburg et al. | .. 455/562.1 |
| 7,577,449 B2 * | 8/2009 | Simpson et al. | ............. 455/458 |

FOREIGN PATENT DOCUMENTS

| | | |
|---|---|---|
| EP | 1278389 A1 | 1/2003 |
| GB | 2277849 A | 11/1994 |
| WO | WO-2004/077753 A2 | 9/2004 |
| WO | WO-2006/097874 A1 | 9/2006 |
| WO | WO-2006/103276 A1 | 10/2006 |

OTHER PUBLICATIONS

Rohan Mahy, "Network Characteristics Used for AP Selection", IEEE P802.11 Wireless LANs, Oct. 1, 2005, pp. 1-7.

* cited by examiner

*Primary Examiner*—Pablo N Tran
(74) *Attorney, Agent, or Firm*—Harrington & Smith

(57) ABSTRACT

Disclosed herein are apparatus, methods and computer program products for using access point availability information in a wireless communications system. In aspects of the method performed at an access point in a wireless communications system, the access point generates a message indicating the level of availability of the access point; and transmits the message. In aspects of the method performed at user equipment in a wireless communications system, the user equipment receives messages from access points in the wireless communications system, the messages containing access point availability information indicating the respective levels of availability of the access points available for selection by the user equipment; and selects an access point in dependence on the access point availability information. In variants, the user equipment may perform additional steps to determine whether a current or contemplated operating mode requires selection of an access point be made in dependence on access point availability information associated with the access point. Only if the current or contemplated operating mode provides a quality of service that is dependent on level of availability of an access point will the access point availability information be consulted when selecting an access point.

20 Claims, 4 Drawing Sheets

APPARATUS, METHOD AND COMPUTER PROGRAM PRODUCT PROVIDING SYSTEM INFORMATION ADVERTISEMENT EXTENSION FOR DYNAMIC NETWORKS

CLAIM OF PRIORITY FROM A COPENDING PROVISIONAL PATENT APPLICATION

Priority is herewith claimed under 35 U.S.C. §119(e) from co-pending Provisional Patent Application 60/758,758, filed on Jan. 13, 2006 by Petteri Pöyhönen and Ove Strandberg entitled "APPARATUS, METHOD AND COMPUTER PROGRAM PRODUCT PROVIDING SYSTEM INFORMATION ADVERTISEMENT EXTENSION FOR DYNAMIC NETWORKS". The disclosure of this Provisional Patent Application is hereby incorporated by reference in its entirety as if fully restated herein.

TECHNICAL FIELD

The exemplary and non-limiting embodiments of this invention relate generally to wireless communications systems methods, systems and devices and, more specifically, relate to wireless access techniques, particularly in those systems that employ intermediate relay access nodes between primary access nodes and user equipment.

BACKGROUND

The following abbreviations are herewith defined:

| | |
|---|---|
| AP | access point |
| BS | base station |
| BTS | base transceiver station |
| HO | hand over |
| QoS | quality of service |
| RAT | radio access technology |
| RN | relay node |
| RNC | radio network controller |
| System Info | system information |
| TCP | transmission control protocol |
| UE | user equipment (also referred to as a mobile device, e.g. a cellular telephone) |

When a UE receives system info advertisements from different APs/BSs current wireless systems and use cases assume that the APs/BSs are part of a static infrastructure. However, considering that networking is evolving to become more dynamic in nature, and that fixed access networks may utilize forwarding/routing/relaying capabilities of certain dynamic services, this assumption has or will become obsolete.

SUMMARY OF THE INVENTION

A first embodiment of the invention is a method comprising: at an access point in a wireless communications system, generating a message comprising at least access point availability information, the access point availability information indicating a level of availability provided by the access point, wherein the access point availability information may be used by other elements of the wireless communications system in deciding whether to use the access point to perform a communication operation; and transmitting the message comprising at least the access point availability information.

A second embodiment of the invention is a user equipment comprising: a memory storing a program configured to control the user equipment when executed; a transceiver configured for bidirectional communication in a wireless communication system, the transceiver further configured to receive a message containing at least access point availability information concerning at least one access point in the wireless communications system; a data processor coupled to the memory and transceiver, the data processor configured to execute the program; and wherein when the data processor executes the program the user equipment is configured to determine whether an operating mode of the user equipment requires that access point availability information be considered when selecting an access point; and, if an operating mode requires that access point availability information be considered, to consult access point availability information contained in messages received by the transceiver when selecting an access point.

A third embodiment of the invention is an access point in a wireless communications system, the access point comprising: a memory storing a program configured to control the access point when executed; a transceiver configured for bidirectional communication in the wireless communication system; a data processor coupled to the memory and transceiver, the data processor configured to execute the program; and wherein when the program is executed by the data processor, the access point is configured to generate a message containing access point availability information; and to cause the transceiver to transmit the message.

A fourth embodiment of the invention is a computer program product comprising a computer readable memory medium tangibly embodying a computer readable program, the computer readable program executable by data processing apparatus, the computer readable program, when executed, configured to generate a message at an access point in a wireless communications system indicating a level of availability of the access point; and to cause the access point to transmit the message.

A fifth embodiment of the invention is a computer program product comprising a computer readable memory medium tangibly embodying a computer readable program, the computer readable program executable by data processing apparatus, the computer readable program, when executed, configured to cause user equipment to receive messages from access points in a wireless communications system, wherein the messages contain access point availability information, the access point availability information indicating respective levels of availability of the access points; to consult the access point availability information when selecting an access point to perform a communication operation; and to select an access point in dependence on the information indicating the persistence of the access points.

DETAILED DESCRIPTION

The exemplary embodiments of this invention provide a technique and a mechanism to extend system information advertised by RAT APs/BSs to facilitate access network characteristics in a dynamic network environment. In accordance with the exemplary embodiments of this invention an additional information element is added to system info that presents an indication of how static/dynamic the access situation currently is, the indication being proportional to the possible usage time (lifetime) of related access. The additional information element that is added to the system info can also be related to how mobile the AP/BS is. For example, the information element may indicate that to fully use this particular network attachment, the device's mobility/moving should be able to support a speed of up to 50 km/h.

In a dynamic network environment both dynamic and fixed installations of APs/BSs may advertise network access to UEs, and by also advertising an expectation value of the network access lifetime, are enabled to provide additional information for UEs to perform optimal network access selection.

It is noted at the outset that the exemplary embodiments of this invention are not restricted for use with any one particular type of wireless communication system or technology, and are generally applicable to different mobile cellular and non-cellular network architectures. As such, the ensuing description of FIG. 1 is not intended to be limiting in any way upon the practice and/or use of the exemplary embodiments of this invention.

Figure 1:
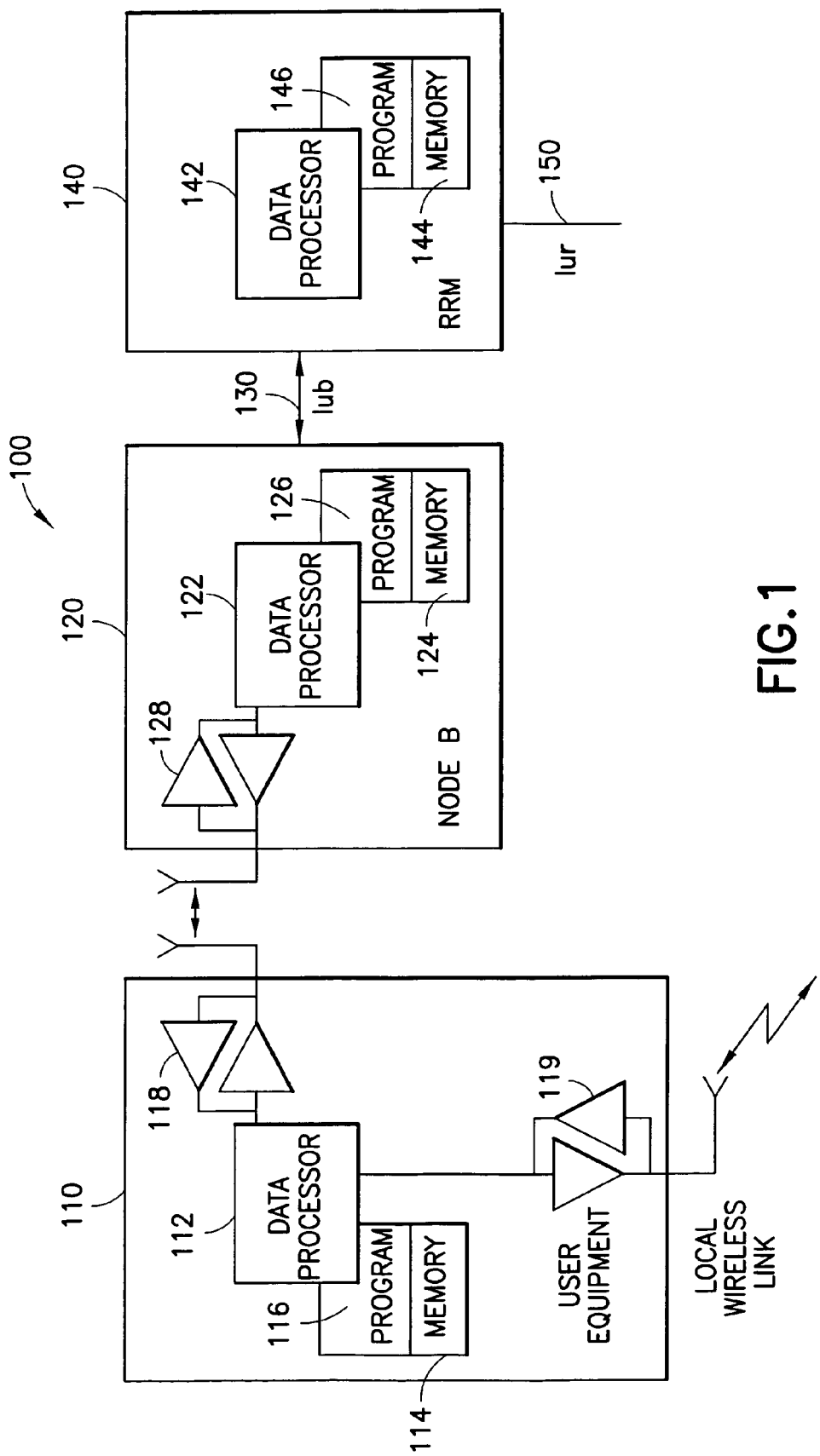
FIG. 1 shows a simplified block diagram of various electronic devices that are suitable for use in practicing the exemplary embodiments of this invention.

Reference is made to FIG. 1 for illustrating a simplified block diagram of various electronic devices that are suitable for use in practicing the exemplary embodiments of this invention. In FIG. 1 a wireless network 100 is adapted for communication with a UE 110 via a Node B (BS) 120. The network 100 may include a RNC 140, which may be referred to as a serving RNC (SRNC). The UE 110 includes a data processor (DP) 112, a memory (MEM) 114 that stores a program (PROG) 116, and a suitable radio frequency transceiver 118 for bidirectional wireless communication with Node B 120, which also includes a DP 122, a MEM 124 that stores a PROG 126, and a suitable RF transceiver 128. The Node B 120 is coupled via a data path 130 (Iub) to the RNC 140 that also includes a DP 142 and a MEM 144 storing an associated PROG 146. The RNC 140 may be coupled to another RNC (not shown) by another data path 150 (Iur). At least one of the PROGs 116, 126 and 146 is assumed to include program instructions that, when executed by the associated DP, enable the electronic device to operate in accordance with the exemplary embodiments of this invention, as will be discussed below in greater detail.

In general, the various embodiments of the UE 110 can include, but are not limited to, cellular telephones, personal digital assistants (PDAs) having wireless communication capabilities, portable computers having wireless communication capabilities, image capture devices such a digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Note that the UE 110 can include, in addition to the (long range) transceiver 118, a short range (local) transceiver 119, such as an RF or optical Bluetooth transceiver. By the use of the short range transceiver 119 the UE 110 may communicate with local APs or RNs, and may in turn function as a RN, via the Node B, of the wireless network 100.

The embodiments of this invention may be implemented by computer software executable by the DP 112 of the UE 110 and the other DPs, such as the DP 121 of the Node B 120, or by hardware, or by a combination of software and hardware.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

One non-limiting advantage of the use of the exemplary embodiments of this invention is that the UE 110, which additionally may include multi-access support (e.g., the local transceiver 119), is enabled to perform network access selection in a dynamic network environment. The UE 110 is provided information that represents a predicted access serving time (lifetime) of a network access node or access point, enabling the UE 110 to use this information as part of a network access selection procedure to provide more optimal access for the user, possibly in accordance with user preferences. The information provided to the UE 110 is called "access point availability information", and reflects the expected level of availability of the access point.

The lifetime information may be locally configured or, by Relay Nodes may use similar information as the entities providing access for them.

Figure 2:
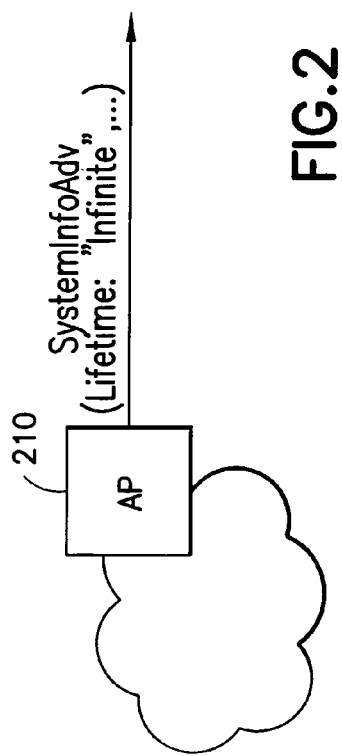
FIG. 2 shows an embodiment of a static or pseudo-static network AP that advertises an infinite lifetime in accordance with the invention.
Figure 3:
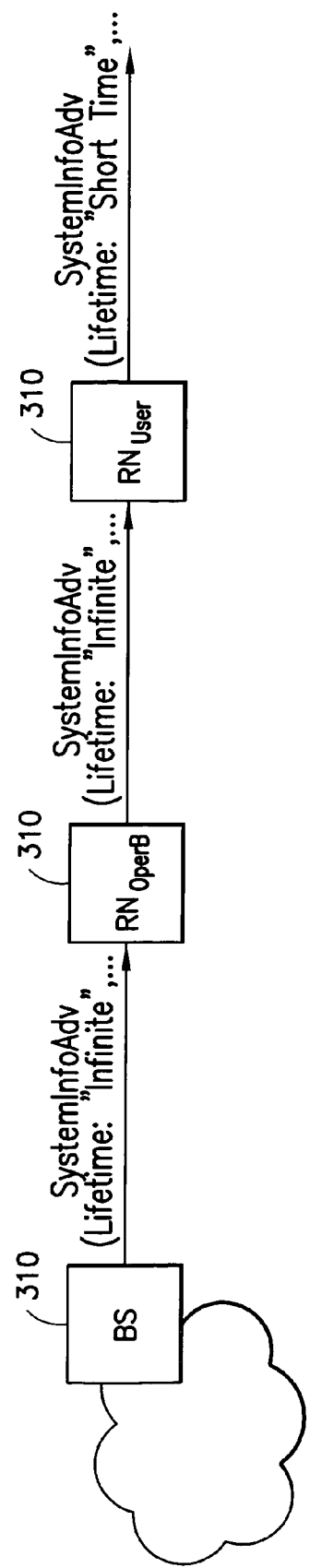
FIG. 3 shows an embodiment of various static and dynamic network APs that advertise infinite lifetimes and less than infinite lifetimes, respectively, in accordance with the invention.

FIGS. 2 and 3 show two non-limiting examples of the use of the invention.

In FIG. 2 an AP 210 (such as the Node B in FIG. 1) associated with an Operator A (OperA) access network, such as one that is part of a fixed infrastructure, may advertise in a System Information Advertisement (SystemInfoAdv) message that it is always available to provide access services by explicitly advertising an "Infinite" lifetime. This same functionality may also be achieved by omitting the lifetime information in the SystemInfoAdv message, which in this case would implicitly indicate that the entity advertising access is part of a fixed infrastructure and is assumed to be always available for providing access.

In FIG. 3 a BS 310 in an OperB access network, that is also part of a fixed infrastructure, may advertise in a SystemInfoAdv message that it is always available to provide access services by explicitly advertising an "Infinite" lifetime. Assume in this case that OperB also includes at least one RN 320 that represents a (temporary) extension of the OperB access network, and the RN 320 also correspondingly advertises an "Infinite" lifetime. Assume now further that another RN 330, such as the UE 110, is used for further extending the access network of OperB instead advertises a "short time" lifetime. This can be due to the fact that a UE 110, when functioning as a RN, may be expected to change location frequently and/or be periodically powered on and off. There may be certain exceptions, and advertised lifetimes may be adjusted accordingly by each device that advertises and provides access to other devices.

The foregoing considerations apply as well to the case of multi-access devices that typically often have wide range coverage and, additionally, may have some short to midrange access available (e.g., Bluetooth capability) that possibly provides increased bandwidth. However, it may not always be feasible to use this bandwidth or other radio technology characteristics to perform access selection.

Depending on user mobility and service characteristics some access attachment options, such as during HO, may also be considered. For example, when driving a vehicle the typically frequent HO required naturally guides the HO to macrocell BTSs. In this case short lifetime available BTSs are possible (as the mobile device will soon leave and break the attachment). Short breaks between the attachment points may be acceptable for some devices (such as data-based TCP connections) and, in this case, a series of intermittent short lived accesses with high BW may be selected.

For those access extension architectures using RNs the last leg(s) may be implemented with moving mobile devices having relay capabilities. However, only those users with low mobility may wish to use such relay nodes with less than Infinite lifetimes. High mobility nodes have their own frequent HOs to cope with, and thus may avoid the use of AP RNs having short lifetimes.

The lifetime may be calculated using a plurality of different parameters including, but not limited to, the radio technology in use, the network topology and/or the characteristics of the relevant application(s).

One important application for the use of the lifetime information is in the relay network scenario. While fixed and static RNs may have Infinite lifetimes, for achieving coverage and forwarding capacity enhancements the use of limited (less than Infinite) lifetime RNs is important. It can be shown that significant relay network coverage can be realized if just a few percentage of mobile nodes can be identified to form the access network extension. The ability to identify which mobile nodes exhibit a longer lifetime, in accordance with the exemplary embodiments of this invention, aids in the relay network deployment and mobile node selection. In general, it may be assumed that longer lifetime access nodes are those closest to the BTSs/APs, while shorter lifetime nodes are those located further away from the BTSs/APs.

There are a number of ways in which the lifetime information may be partitioned and presented. For example, one embodiment may expressly advertise the lifetime in, for example, seconds or minutes. However, this approach may be less preferred, as it could require some significant number of bits for expressing the lifetime information in the SystemInfoAdv message. One possibly more preferred approach defines some predetermined number of lifetime classes, enabling some optimum bit-wise frame encoding to be selected. One non-limiting example of this approach is as follows:

| CLASS | MEANING |
| --- | --- |
| 1 | random; typically very random, such as less than one minute |
| 2 | short; typically between 1 and 5 minutes |
| 3 | short+; typically between 5 and 30 minutes |
| 4 | average; typically between 30 minutes and 1 hour |
| 5 | average+; typically between 1 hour and 3 hours |
| 6 | long; typically between 3 hours and 1 day |
| 7 | days; typically one or more days |
| 8 | infinite; static, semi-static or pseudo-static installation |

Note that this particular representation having eight classes can be encoded using three bits, and thus a three bit Information Element (IE) can be defined to be included within the SystemInfoAdv message. In an even simpler approach a single bit may be defined to indicate either the "static" or "dynamic" nature of the access point.

It should be further noted that if a first relay AP having a non-Infinite lifetime is in turn receiving access from a second AP that also has a non-infinite lifetime, then the lifetime advertised by the first relay AP may be adjusted in consideration of the lifetime advertised by the second AP. This adjustment may be made, as one non-limiting example, by operating a computer program, such as the PROG 146 in FIG. 1, for determining a probability that the first AP will be available during its predicted lifetime in view of the advertised availability of the second AP, or by any suitable technique. As another example, the first AP may check to see if the lifetime of the second AP is less than its own and, if so, it may advertise the second AP's lifetime, otherwise it advertises its own lifetime.

How the mobile node of UE 110 uses the lifetime information is application-specific. For example, some UEs 110 may simply ignore the lifetime information, while others may consider it when seeking to gain access to an operator. In the latter case the choice of AP can be based on the current needs of the UE 110, such as whether the UE 110 wishes to make a voice call or a data call. In general, the choice of a particular AP, based at least in part on the lifetime information provided in accordance with exemplary embodiments of this invention, can be a function of the current QoS needs of the UE 110. The speed of the UE 110 or of the RN, if mobile, may also be a consideration.

Figure 4:
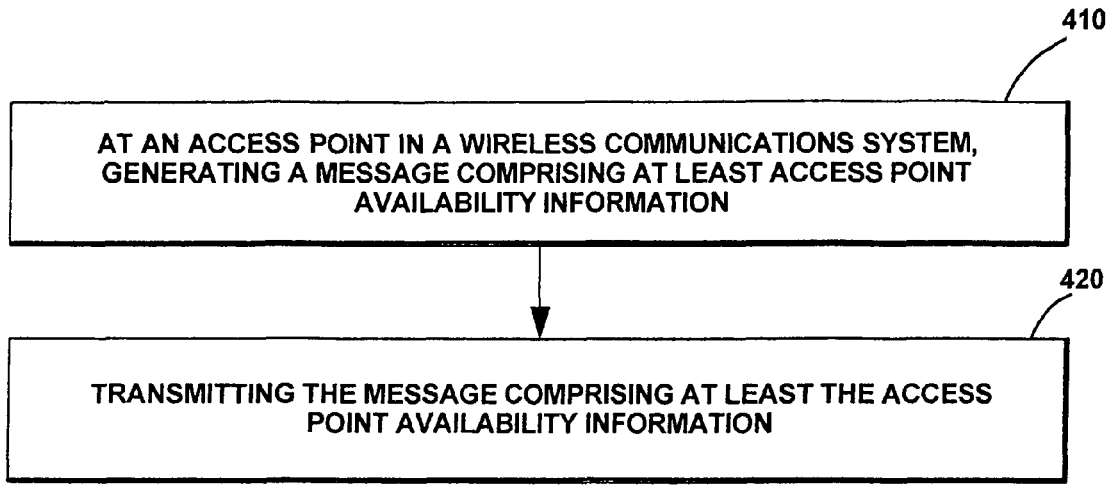
FIG. 4 is a flow chart depicting a method operating in accordance with the invention.
Figure 5:
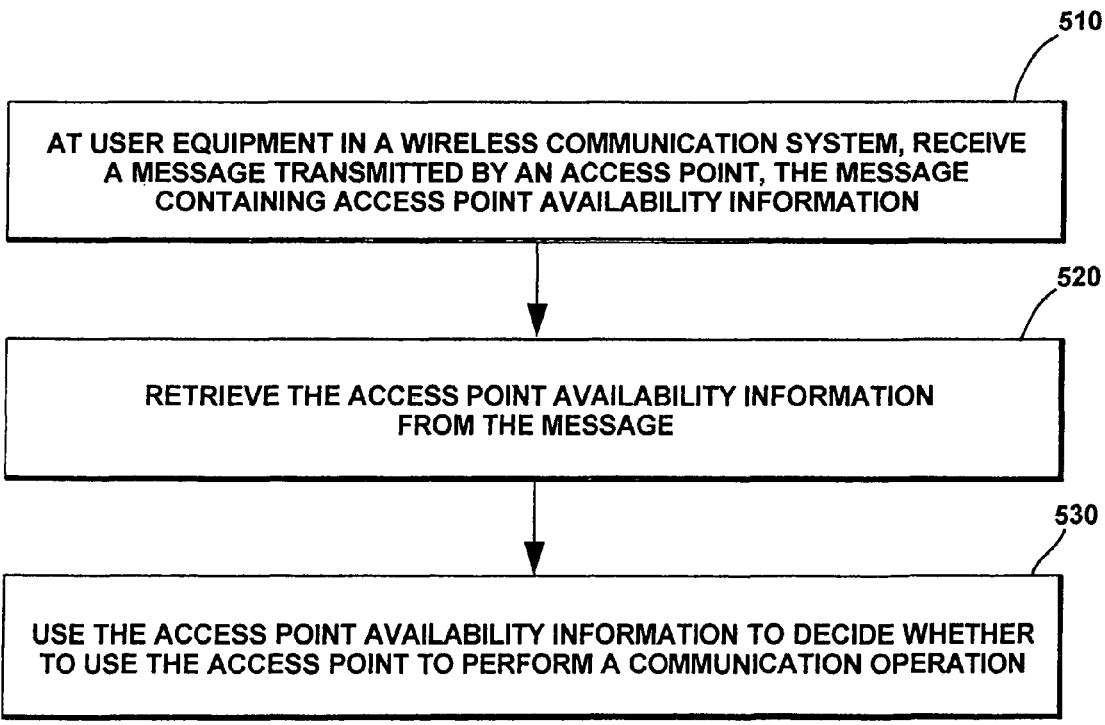
FIG. 5 is a flow chart depicting a method operating in accordance with the invention.
Figure 6:
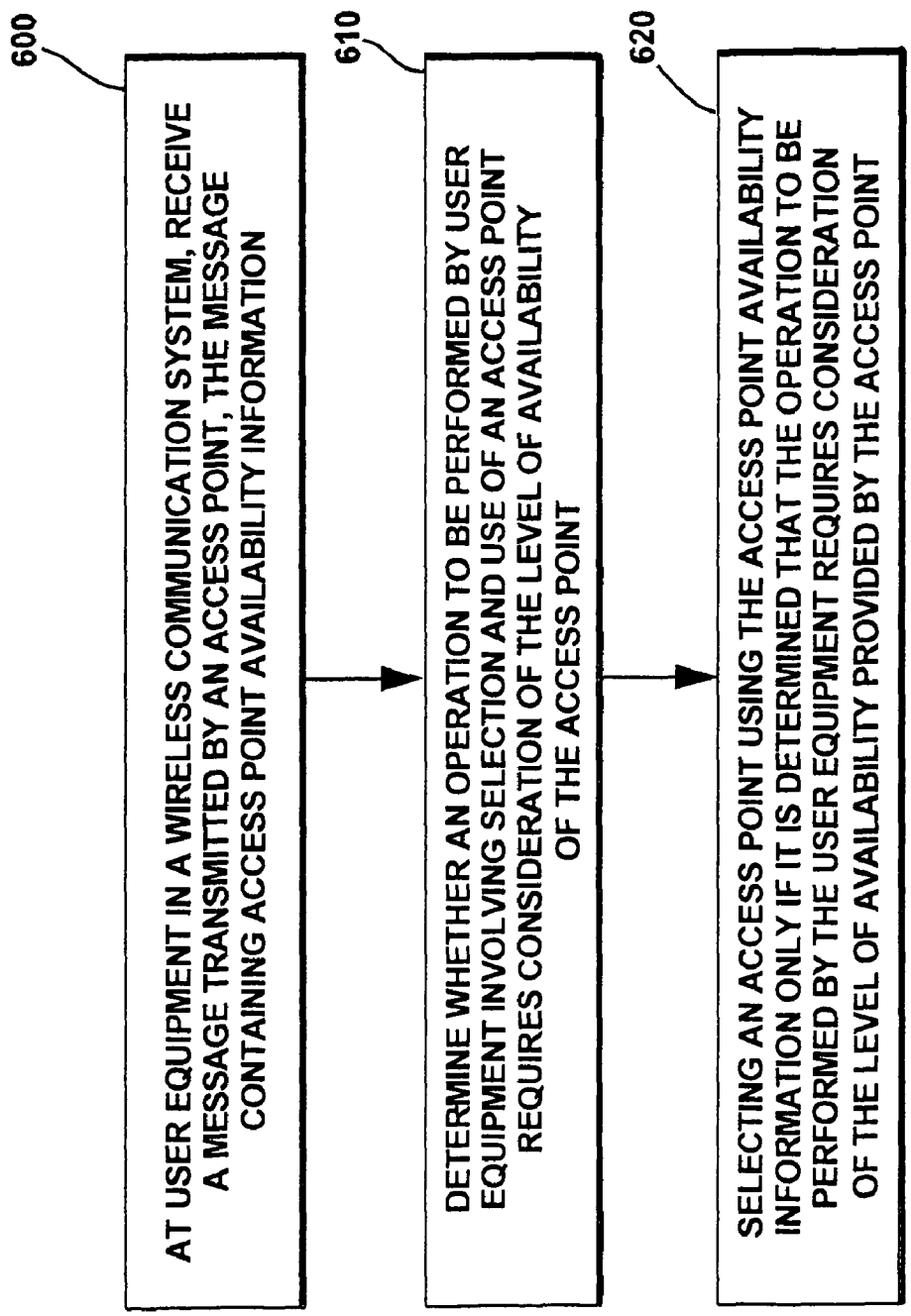
FIG. 6 is a flow chart depicting a method operating in accordance with the invention.

FIGS. 4-6 are flow charts depicting methods operating in accordance with the invention. In the method depicted in FIG. 4, at step 410, an access point in a wireless communications system generates a message comprising at least access point availability information. The access point availability information indicates a level of availability provided by the access point. For example, as described previously, the access point availability information may indicate that the access point is always available. In other situations, the access point may indicate that it is not always available by generating a message communicating that the access point is only available for a finite duration. The access point availability information is made available to other elements in the wireless communication system to help the other elements to decide whether to use the access point to perform a communication operation. Once the message comprising at least the access point availability information has been generated, then it is transmitted at step 420.

In further steps performed at user equipment 110 in the wireless communication system, the user equipment receives the message containing the access point availability information; and then uses the access point availability information to determine whether to select the access point to perform a communication operation.

In various embodiments of the invention, the access point may comprise a base station; a relay node; a mobile node; user equipment; or user equipment functioning as a relay node.

In a further embodiment of the method depicted in FIG. 4, a plurality of access points are each performing the operations indicated in FIG. 4, indicating their relative levels of availability by generating and transmitting messages containing access point availability information.

As indicated previously, there are several ways access point availability information can be encoded. For example, the default position may be that an access point is always available. Accordingly, if a specific identification of a level of availability of an access point is omitted, it may be assumed that the access point is always available. Access points that provide a specific identification of the duration that they are available are assumed not to be available for infinite duration but rather only for the duration identified in the access point availability information.

Access point availability information can be determined in several ways. Typically, access point availability information is determined from at least one of several parameters such as, for example, the mobility of the access point; the topology of the wireless communications network; the applications that are using the access point to perform a communications operations; or characteristics of the applications that use the access point.

In a further variant of the method depicted in FIG. 4, additional steps are performed to use available mobile nodes to extend coverage in the wireless communications network. In the further variant, a plurality of access points generate and transmit messages containing access point availability information, and a subset of the plurality of access points further comprise a plurality of mobile nodes. In the further variant, an additional step is performed, the step comprising: using access point availability information contained in messages transmitted by each of the plurality of mobile nodes to select certain of the mobile nodes to operate as relay nodes. Typically, the mobile nodes selected to operate as relay nodes exhibit relatively greater levels of availability than nodes not selected to operate as relay nodes.

In yet another variant of the method depicted in FIG. 4, it is assumed that communication operations are being performed through a plurality of access points comprising a chain, where each access point of the plurality is generating and transmitting messages containing access point availability information. For example, a first access point may be providing service using a second access point. If the level of availability of the second access point varies, for example, the first access point may have to adjust its own level of availability when generating access point availability information. This is done in order to reflect the effect of the variability of the level of availability of the second access point on the level of availability of the first access point. In such a situation, additional steps would be performed at the first access point, the additional steps comprising: receiving messages from the second access point containing the access point availability information associated with the second access point; and adjusting the access point availability information generated by the first access point, reflecting that the level of availability provided by the first access point is dependent on the level of availability provided by the second access point.

FIG. 5 depicts a method performed at user equipment in a wireless communications system. At step 510, a user equipment operative in a wireless communications system receives a message transmitted by an access point, the message containing access point availability information. Next, at step 520, the user equipment retrieves the access point availability information from the message. Then, at step 530, the user equipment uses the access point availability information to decide whether to use the access point to perform a communication operation.

It may not be necessary for the user equipment to consult access point availability information every time the user equipment will use an access point to perform a communications operation. In such situations, an alternate method depicted in FIG. 6 may be used. At step 600, user equipment in a wireless communication system receives a message transmitted by an access point, the message containing access point availability information. Next, at step 610, the user equipment determines whether an operation to be performed by the user equipment involving selection and use of an access point requires consideration of the level of availability of the access point. Then, at step 620, the user equipment selects an access point using the access point availability information only if it is determined that the operation to be performed by the user equipment requires consideration of the level of availability provided by the access point.

Based on the foregoing it should be apparent that the exemplary embodiments of this invention provide a method, apparatus and computer program product(s) to provide from a network access node an indication of the availability of the access node to function in this capacity for a UE, or for another access node. The use of the exemplary embodiments of this invention enables more optimal network access selection to be performed by a UE, and also has the potential to enhance the user's experience.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it will be well understood that these blocks, apparatus, systems, techniques or methods described herein may be implemented in, as non-limiting examples, hardware, software, firmware, special purpose circuits of logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level diagram into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. As one non-limiting example, the lifetime information may be provided in other than a SystemInfoAdv or similar type of message. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
    at an access point in a wireless communications system,
        generating a message comprising at least access point availability information, the access point availability information indicating a level of availability provided by the access point, wherein the access point availability information may be used by other elements of the wireless communications system in deciding whether to use the access point to perform a communication operation, wherein the access point availability information identifies a time period during which the access point will be available; and transmitting the message comprising at least the access point availability information.

2. The method of claim 1 further comprising:
receiving at user equipment operative in the wireless communication system the message containing the access point availability information; and
using at the user equipment the access point availability information to determine whether to select the access point to perform a communication operation.

3. The method of claim 1 wherein the access point is a base station in a wireless telecommunications network.

4. The method of claim 1 wherein the time period is not limited indicating that the access point is always available.

5. The method of claim 1 wherein the time period is of finite duration indicating that the access point is not always available.

6. The method of claim 1 wherein a plurality of access points are operative in the wireless communications system, each access point transmitting messages used to convey access point availability information.

7. The method of claim 6 wherein only access points that are available less than all the time provide access point availability information that specifically identifies finite time durations during which the access points will be available.

8. The method of claim 7 wherein access points that are available all the time omit access point availability information that specifically identifies a time duration, wherein the omission indicates that the access point is always available.

9. The method of claim 1 further comprising:
determining access point availability information using at least one parameter.

10. The method of claim 9 wherein the at least one parameter concerns mobility of the access point.

11. The method of claim 9 wherein the at least one parameter concerns topology of the wireless communications network.

12. The method of claim 9 wherein the at least one parameter concerns identity of an application that will use the access point during a communications operation.

13. The method of claim 9 wherein the at least one parameter concerns characteristics of an application that will use the access point during a communications operation.

14. The method of claim 9 wherein the access point is a relay node.

15. The method of claim 14 wherein a plurality of relay nodes generate and transmit messages containing access point availability information identifying their respective levels of availability.

16. The method of claim 1 where a plurality of access points generate and transmit messages containing access point availability information, and wherein a subset of the plurality of access points comprises a plurality of mobile nodes, the method further comprising:
using access point availability information contained in messages transmitted by each of the plurality of mobile nodes to select certain of the mobile nodes to operate as relay nodes.

17. The method of claim 16 wherein the mobile nodes selected to operate as relay nodes exhibit relatively greater levels of availability than mobile nodes not selected to operate as relay nodes.

18. The method of claim 1 wherein the access point generating the message comprises a first access point, the first access point providing access through a connection with a second access point, the second access point also generating and transmitting messages containing access point availability information indicating a level of availability provided by the second access point, the method further comprising:
at the first access point, receiving messages from the second access point containing the access point availability information associated with the second access point; and
adjusting the access point availability information generated and transmitted by the first access point, reflecting that the level of availability provided by the first access point is dependent on the level of availability provided by the second access point.

19. An access point in a wireless communications system, the access point comprising:
a memory storing a program configured to control the access point when executed;
a transceiver configured for bidirectional communication in the wireless communication system;
a data processor coupled to the memory and transceiver, the data processor configured to execute the program; and
wherein when the program is executed by the data processor, the access point is configured to generate a message containing access point availability information, wherein the access point availability information identifies a time period during which the access point will be available; and to cause the transceiver to transmit the message.

20. A computer program product comprising a computer readable memory medium tangibly embodying a computer readable program, the computer readable program executable by data processing apparatus, the computer readable program, when executed, configured to generate a message at an access point in a wireless communications system indicating a level of availability of the access point, wherein the access point availability information identifies a time period during which the access point will be available; and to cause the access point to transmit the message.

* * * * *